United States Patent
Plowman et al.

(10) Patent No.: US 9,953,473 B2
(45) Date of Patent: Apr. 24, 2018

(54) SYSTEM AND METHOD FOR CREATING PROFILE OF FUEL QUALITY

(71) Applicant: Intel Corporation, Santa Clara, CA (US)

(72) Inventors: Tim Plowman, Berkeley, CA (US); Alexandra C. Zafiroglu, Portland, OR (US); Jennifer Healey, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/023,208

(22) PCT Filed: Dec. 13, 2013

(86) PCT No.: PCT/US2013/075008
§ 371 (c)(1),
(2) Date: Mar. 18, 2016

(87) PCT Pub. No.: WO2015/088556
PCT Pub. Date: Jun. 18, 2015

(65) Prior Publication Data
US 2016/0232725 A1  Aug. 11, 2016

(51) Int. Cl.
*G07C 5/08* (2006.01)
*G07C 5/00* (2006.01)
(Continued)

(52) U.S. Cl.
CPC ..... *G07C 5/0841* (2013.01); *G06F 17/30675* (2013.01); *G06F 17/30696* (2013.01);
(Continued)

(58) Field of Classification Search
CPC . G07C 5/0841; G07C 5/008; G06F 17/30675; G06F 17/30702; G06F 17/30696
(Continued)

(56) References Cited

U.S. PATENT DOCUMENTS 5,668,310 A  9/1997 Parkman et al.
2009/0146846 A1  6/2009 Grossman
(Continued)

FOREIGN PATENT DOCUMENTS

JP  2010195078 A  9/2010
KR  20130082881 A  7/2013
(Continued)

OTHER PUBLICATIONS

"International Application Serial No. PCT/US2013/075008, International Search Report dated Aug. 24, 2015", 3 pgs.
(Continued)

*Primary Examiner* — Nga X Nguyen
(74) *Attorney, Agent, or Firm* — Schwegman Lundberg & Woessner, P.A.

(57) ABSTRACT

Various system and method for creating profiles of fuel quality are described herein. A system to create profiles of fuel quality comprises a receiving module arranged to receive vehicle performance data of a vehicle, the vehicle performance data describing the vehicle's performance over a time period; an association module arranged to associate the vehicle performance data with fuel used by the vehicle during the time period; an analysis module arranged to analyze the vehicle performance data with respect to the fuel to calculate a performance metric of the fuel; and a storage module arrranged to store the performance metric in a performance database at the computing system.

20 Claims, 5 Drawing Sheets

(51) Int. Cl.
*G06F 17/30* (2006.01)
*G06Q 50/30* (2012.01)
(52) U.S. Cl.
CPC ....... *G06F 17/30702* (2013.01); *G06Q 50/30* (2013.01); *G07C 5/008* (2013.01)
(58) Field of Classification Search
USPC .................. 701/29, 31.4; 705/404, 405, 409, 705/410–418
See application file for complete search history.

(56) References Cited

U.S. PATENT DOCUMENTS

| | | | | |
|---|---|---|---|---|
| 2010/0332363 | A1* | 12/2010 | Duddle | B67D 7/348 705/34 |
| 2011/0166773 | A1* | 7/2011 | Raz | B60W 40/09 701/123 |
| 2013/0035788 | A1 | 2/2013 | Divelbiss et al. | |
| 2013/0275013 | A1 | 10/2013 | Kote et al. | |

FOREIGN PATENT DOCUMENTS

| | | |
|---|---|---|
| WO | WO-2015088556 A2 | 6/2015 |
| WO | WO-2015088556 A3 | 6/2015 |

OTHER PUBLICATIONS

"International Application Serial No. PCT/US2013/075008, Written Opinion dated Aug. 24, 2015", 6 pgs.
"European Application Serial No. 13899320.9, Extended European Search Report dated May 18, 2017", w/ English Translation, 10 pgs.
"International Application Serial No. PCT/US2013/075008, International Preliminary Report on Patentability dated Jun. 23, 2016", 8 pgs.

* cited by examiner

SYSTEM AND METHOD FOR CREATING PROFILE OF FUEL QUALITY

CROSS-REFERENCE TO RELATED APPLICATION

This application is a U.S. National Stage Filing under 35 U.S.C. 371 from International Application No. PCT/US2013/075008, filed on Dec. 13, 2013, and published as WO 2015/088556 on Jun. 18, 215, which application is incorporated herein by reference in its entirety.

TECHNICAL FIELD

Embodiments described herein generally relate to vehicle performance and in particular, to a system and method for creating profiles of fuel quality.

BACKGROUND

Vehicle performance is dependent on many factors, including vehicle use, vehicle condition, and vehicle maintenance. In addition to a manufacturer's recommended vehicle maintenance, many manufacturers designate a recommended fuel quality. Fuel quality is measured in terms of an octane rating or an octane number. The higher the octane rating, the more compression the fuel can withstand before detonating. In a high-performance engine, which typically is a high-compression engine, a higher octane rating is recommended.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In many parts of the world gas quality is unreliable. Fuel costs are also generally a concern worldwide. While in the United States gas purchase behaviors are typically based on convenience and location, in other parts of the world other considerations come into play when purchasing petrol or ethanol and shape decision making. In Brazil, the price/quality ratio of petrol versus ethanol comes into play as well as relative safety of the neighborhood. In China, drivers rely on word of mouth and subjective evaluation of gasoline quality to inform their decision making. The routine behaviors that may be observed in the United States are not shared in other parts of the world. Moreover fuel standards and adherence to those standards differs globally. People want to know that they are getting the best value for the gas they are purchasing. The "best value" may be dependent on the type of car and driving style of individual drivers.

In this document, an advanced method for automatically evaluating the "value" and "quality" of gas purchased at different vendors is described. This is performed at the individual level. A fusion of in-vehicle fuel performance diagnostics and crowd sourced information sharing may be advantageous to determine which types of gas are recommended for particular vehicles or driving styles and which gas stations provide the best quality gas. The quality of gas for a vehicle is based on the vehicle performance, which may be obtained using on-board systems, such as on-board diagnostic systems (e.g., OBD I and OBD II).

Figure 1:
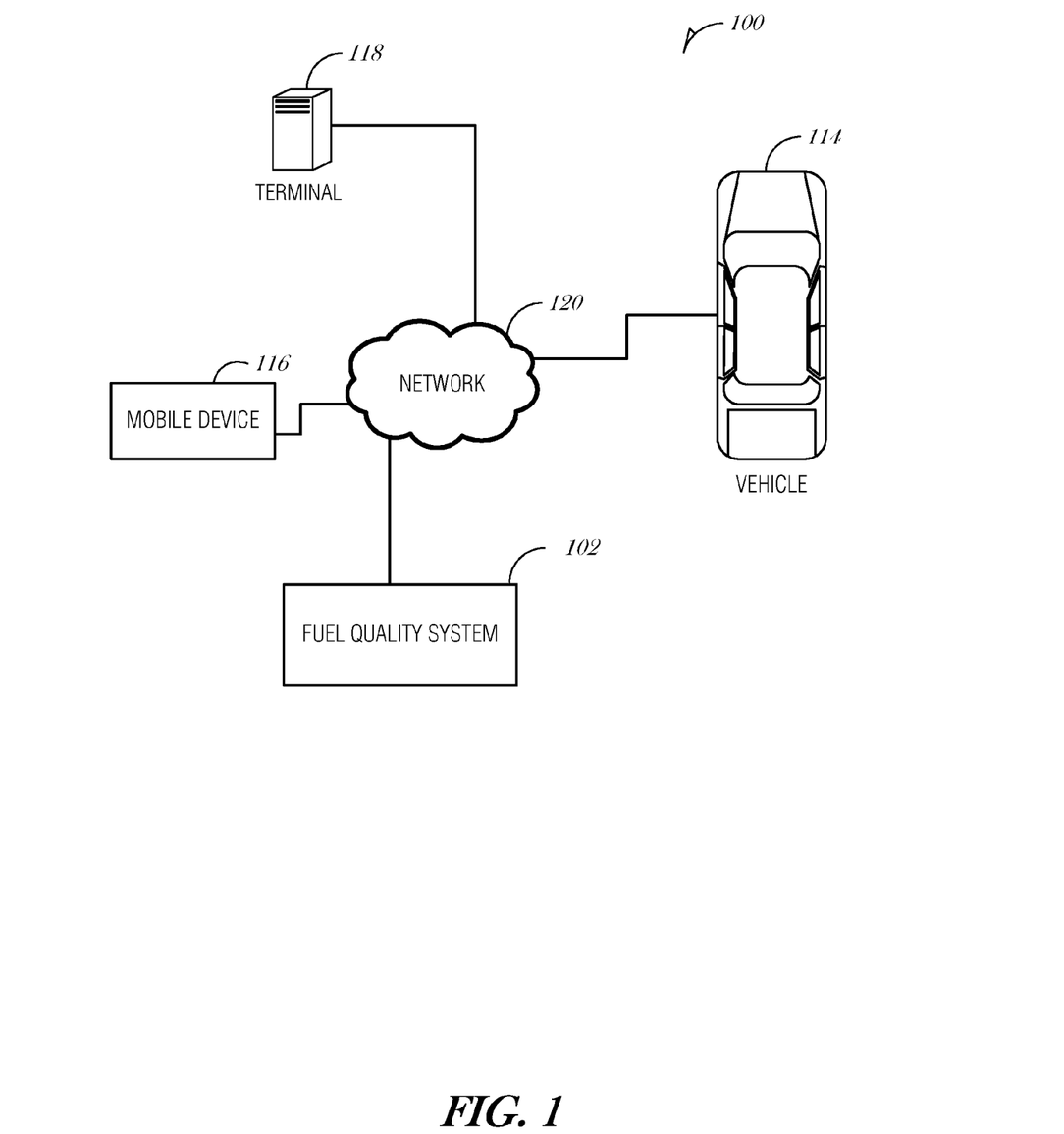
FIG. 1 is a schematic drawing illustrating a system to create a profile of fuel quality, according to an embodiment.

FIG. 1 is a schematic drawing illustrating a system 100 to create a profile of fuel quality, according to an embodiment. Fuel quality is understood to refer to the most effective fuel for a particular vehicle, driving style, geographical region, or some combination of these. Fuel quality is not referring to the highest octane, most expensive fuel, or some other particular fuel characteristic.

FIG. 1 includes a fuel quality system 102, a vehicle 114, a mobile device 116, a terminal 118, communicatively coupled via a network 120.

The mobile device 116 includes devices such as a smartphone, cellular telephone, mobile phone, laptop computer, tablet computer, or other portable networked device. In general, the mobile device 116 is small and light enough to be considered portable and includes a mechanism to connect to a network, either over a persistent or intermittent connection.

The terminal 118 includes a computing device that is capable of wired or wireless communication with the mobile device 116. The terminal 118 may be incorporated into a fuel pump at a fuel station, in an embodiment. In another embodiment, the terminal 118 may be housed inside of a retail area of a fuel station. In some embodiments, the terminal 118 may act as a communication conduit between a vehicle operator and the fuel quality system 102, by way of the mobile device 116 and/or the vehicle 114.

The network 120 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 120 may include a single local area network (LAN) or wide-area network (WAN), or combinations of LANs or WANs, such as the Internet. The various devices coupled to the network 114 may be coupled to the network 114 via one or more wired or wireless connections.

The vehicle 114 may be of any type of vehicle, such as a commercial vehicle, consumer vehicle, or recreation vehicle. The vehicle 114 includes an on-board diagnostics system to record vehicle operation and other aspects of the vehicle's performance, maintenance, or status.

In operation, the vehicle 114 is driven for a period of time, during which the on-board diagnostics system records various data. Data may include, but is not limited to average fuel consumption (e.g., miles per gallon or kilometers per liter), acceleration/deceleration patterns, average vehicle speed, amount of fuel consumed, emissions, and the like. When the vehicle 114 is refueled, the vehicle's on-board diagnostics system is queried and certain data is retrieved. The data may be retrieved by the terminal 118, the mobile device 116, or the fuel quality system 102, or some combination of these. Based on the vehicle's operating characteristics during the period before the refill and the fuel used during that period, the fuel quality system 102 may calculate a fuel performance rating. The fuel performance rating may be specific for the vehicle, the driving or operator characteristics, or other aspects of the vehicle's operation or status. This fuel performance rating may be adaptively adjusted over time to reflect the various fuels used in the vehicle 114, the driver's operation of the vehicle 114, and the like.

Thus, the systems and methods described herein provide a quality metric on how a particular gas performs in a particular vehicle. Such information may be shared with other drivers to develop a consensus on where the best quality fuel for a particular vehicle may be purchased. This results in an individualized quality metric that is shared among similar drivers or people with similar vehicles. Over time, the crowd sourced data provides a relatively reliable database of knowledge for people. The measure occurs in the vehicle and on-board systems, not in equipment at the station. Driving behavior may mediate the basic raw miles per gallon measure. The statistics used to infer performance/quality begin at the tank fill up and end at the next fill up. This unit of measure provides the basis for quality metric.

Figure 2:
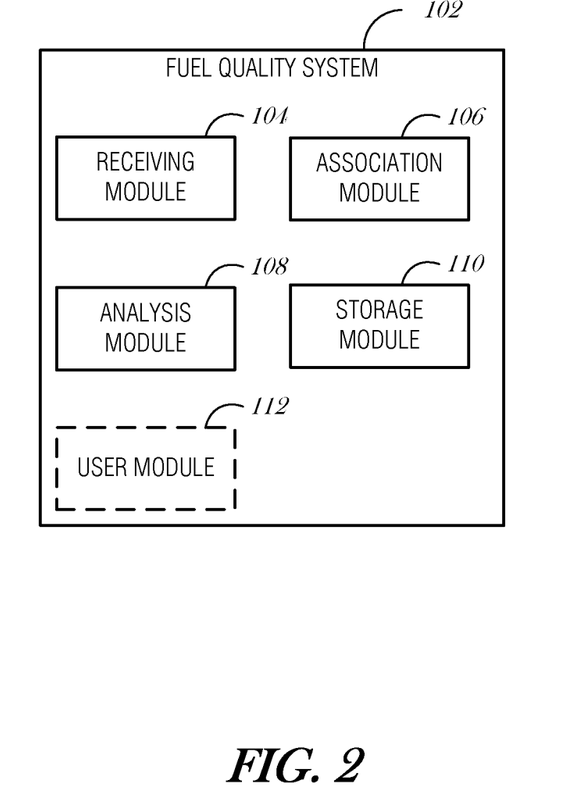
FIG. 2 is a block diagram illustrating a fuel quality system, according to an embodiment.

FIG. 2 is a block diagram illustrating a fuel quality system 102, according to an embodiment. The fuel quality system 102 includes a receiving module 104, an association module 106, an analysis module 108, a storage module 110, and optionally, a user module 112.

The receiving module 104 is may be used to receive vehicle performance data of a vehicle, the vehicle performance data describing the vehicle's performance over a time period. As discussed above, the fuel quality system 102 may receive vehicle performance data from the vehicle's on-board system or from a vehicle operator. Thus, in an embodiment, to receive vehicle performance data of the vehicle, the receiving module 104 is arranged to query an on-board vehicle system and receive vehicle performance data from the on-board vehicle system. The on-board vehicle system may comprise an on-board diagnostics system, such as ODB II.

In another embodiment, to receive vehicle performance data of the vehicle, the receiving module 104 is arranged to access a terminal incorporated into a fuel pump station and receive vehicle performance data from the terminal. The terminal may be configured to request and receive the vehicle performance data from an operator of the vehicle while at the fuel pump station. Alternatively, the terminal may be configured to request and receive the vehicle performance data from an on-board vehicle system incorporated into the vehicle while the vehicle is located at the fuel pump station.

The association module 106 is may be used to associate the vehicle performance data with fuel used by the vehicle during the time period. In an embodiment, to associate the vehicle performance data with fuel used by the vehicle, the association module 106 is arranged to identify the vehicle and search a vehicle database to determine the fuel used at a previous fueling of the vehicle.

The vehicle database may include various data, such as characteristics of the vehicle, characteristics of the vehicle's operation, and characteristics of fuel used in the vehicle. The characteristics of the vehicle may include at least one of a make, a model, or a year. The characteristics of the vehicle's operation may include at least one of a driving style, an average operating speed, or a distance since the last fueling. The characteristics of fuel used in the vehicle may include at least one of an octane rating, a volume of fuel, a brand of fuel, a fuel additive, a fuel type.

The analysis module 108 may be used to analyze the vehicle performance data and the fuel to calculate a performance metric. In an embodiment, to analyze the vehicle performance data and the fuel, the analysis module is arranged to determine a driving profile of the vehicle during the time period, identify a fuel mixture used during the time period, calculate a confidence factor based on the fuel mixture, and calculate a fuel performance rating for the driving profile, the fuel performance rating weighted by the confidence factor.

The storage module 110 may be used to store the performance metric in a performance database at the computing system.

In a further embodiment, the fuel quality system includes a user module 112 arranged to receive a request for a fuel recommendation from a user, the request including a vehicle identification. The user module 112 may then search the performance database for a vehicle to match the vehicle identification and based on the vehicle, identify a fuel having a fuel performance rating. After obtaining the fuel having the fuel performance rating, the user module 112 may provide the fuel and the fuel performance rating to the requesting user. In an embodiment, the fuel identified has the highest fuel performance rating for the vehicle. In other embodiments, the fuel identified may be one of a plurality of fuels, each with a performance rating. The additional information may be useful for a user to make a decision on a fuel purchase if one fuel is not available, more expensive, or otherwise inconvenient to access.

Figure 3:
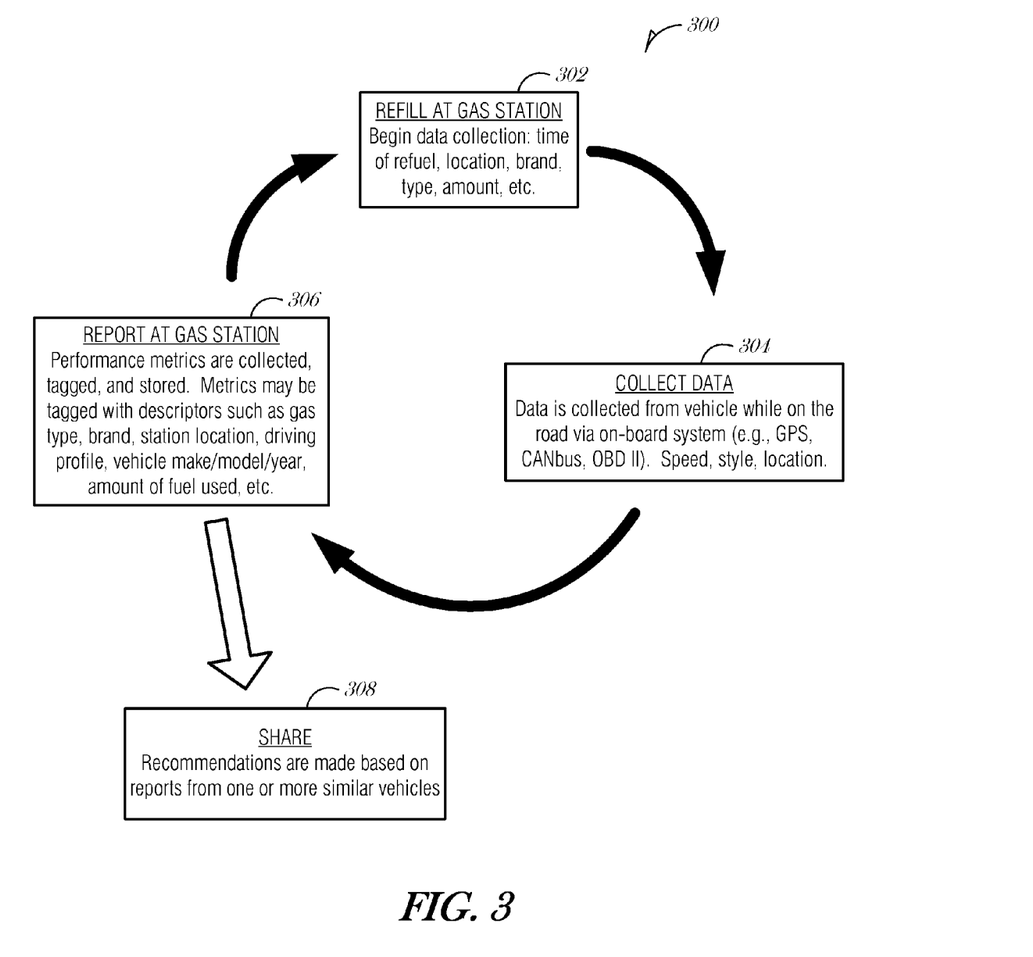
FIG. 3 is a diagram illustrating a lifecycle of data for creating profiles of fuel quality, according to an embodiment.

FIG. 3 is a diagram illustrating a lifecycle of data 300 for creating profiles of fuel quality, according to an embodiment. At block 302, a vehicle is refilled at a gas station. At this time, the data collection begins. Data such as the time of the refuel, the location of the fuel station, the brand or type of fuel used, the octane rating of the fuel, any additives used in the fuel, the amount of fuel, the cost of the fuel, and other fuel-related data may be collected.

At block 304, vehicle performance data is collected. The vehicle performance data is collected during the vehicle's operation.

At block 306, the performance metrics are collected. This may be performed at the next refueling. Alternatively, the performance metrics may be gathered at any time during the vehicle's operation on a periodic or regular schedule (e.g., hourly, daily, or weekly). Monitoring of individual car performance may be tagged with gas type, gas brand, station location, driving profile (e.g., style, speed, temp, miles), and vehicle make and model. Additional tags may include last oil change, tire pressure, last tune up, and other maintenance. Much of this data can be culled from the CANbus or on-board system while the reminder of it may be reported by the drivers themselves through an application. For example, a driver may download an application from an application repository, install the application on the driver's mobile device, and use the application to monitor the vehicle's operation, report vehicle-related data, request recommended fuel, share vehicle reports, and the like.

At block 308, fuel recommendations may be made to the driver or to other drivers who have similar vehicles, driving styles, location, etc. Other drivers who have similarly downloaded and installed the application may be provided fuel recommendations based on the driver's data. Drivers who are part of this network may foster trust for certain fuels, fuel stations, or vehicles based on the fuel performance metrics that are shared.

Using such systems, drivers are able to proactively monitor fuel efficiency and quality linked to a particular tank of gas from a particular fueling location. Data from the pump (price, quantity, grade, etc.) may be communicated to the car. The car's relevant data (fuel level, car make, model, mileage since last fill up, even driving behaviors) can be pulled from the CAN bus and stored in the car's built-in computing system. When the gas cap is detected as being off, the location is automatically captured, triggering the system to search for data associated with the fuel being pumped as well as the location of the gas station. The collected data is telemetered either back to the vehicle for display on the head unit or transmitted to a mobile device, where it can be analyzed, anonymized, and then shared. The telemetry may be performed via near-field communications (NFC) or radio frequency (RF).

The device or vehicle then displays the information about fuel performance to the driver along with comparative historical stats from other fueling events. For example the vehicle may assess that during the last tank of gas from vendor "X" the MPG was "Y" during a driving history that included 40% city driving, 40% highway driving in traffic, and 20% highway driving at high speeds. It may also record a finer grained assessment of how the fuel performed in each of these driving modes in terms of both efficiency and other factors of interest such as emissions. Fuel efficiency may be weighted based on the mixed gasoline types currently in the tank. This accounts for the fact that commonly, a driver refuels a vehicle when the vehicle still has some fuel left in the tank. These internal assessments may be individually useful, but gain value when shared with a trusted circle of other vehicles/owners who may access pooled and individual stats from other fuel purchasers.

Such a system allows vehicle owners to make better informed decisions about where to buy the best fuel and even the best fuel for a particular car or for a particular driving style. This data is stored on a server and may be accessed at any time with appropriate permissions via a mobile device or in-vehicle system, by members of the trusted circle. This data may be shared with original equipment manufacturers (OEMs) or other relevant entities in exchange for some form of compensation to the drivers. This data may then be analyzed and used by OEMs for product development, marketing communications regarding quality/performance, etc.

Figure 4:
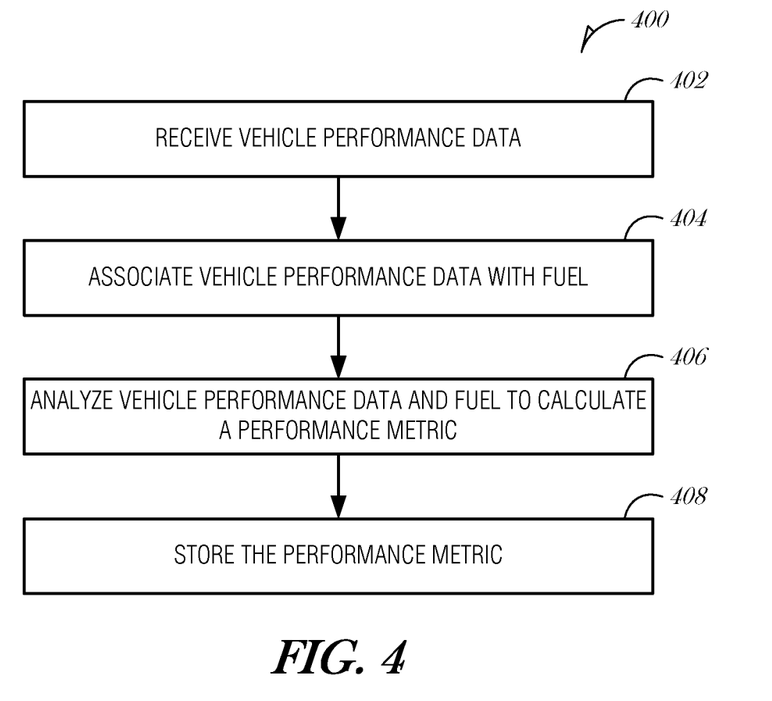
FIG. 4 is a flowchart illustrating a method for creating profiles of fuel quality, according to an embodiment.

FIG. 4 is a flowchart illustrating a method 400 for creating profiles of fuel quality, according to an embodiment. At 402, vehicle performance data of a vehicle is received, with the vehicle performance data describing the vehicle's performance over a time period. The vehicle performance data may be received by a computing system. In an embodiment, receiving the vehicle performance data includes querying an on-board vehicle system and receiving vehicle performance data from the on-board vehicle system. The on-board vehicle system comprises an on-board diagnostics system, such as ODB II.

In another embodiment, receiving the vehicle performance data includes accessing a terminal incorporated into a fuel pump station and receiving vehicle performance data from the terminal. The terminal may be incorporated into a fuel pump or otherwise available from a fuel station. The terminal may be configured to request and receive the vehicle performance data from an operator of the vehicle while at the fuel pump station. For example, at the fuel pump, a touchscreen display may be used to query the driver as the vehicle is being refueled. As another example, the terminal may query a mobile device that the driver is using.

In yet another example, the terminal may query the driver via an on-board system, such as a navigation system in the vehicle. Thus, in an embodiment, the terminal is configured to request and receive the vehicle performance data from an on-board vehicle system incorporated into the vehicle while the vehicle is located at the fuel pump station.

At 404, the vehicle performance data is associated with fuel used by the vehicle during the time period. In an embodiment, associating the vehicle performance data with fuel used by the vehicle includes identifying the vehicle and searching a vehicle database to determine the fuel used at a previous fueling of the vehicle. The vehicle may be identified by a unique identifier, such as a vehicle identification number (VIN), license plate number, driver's license number, or the like. The vehicle database may include characteristics of the vehicle, characteristics of the vehicle's operation, and characteristics of fuel used in the vehicle, in various embodiments. For example, the characteristics of the vehicle may include at least one of a make, a model, or a year. The characteristics of the vehicle's operation may include at least one of a driving style, an average operating speed, or a distance since the last fueling. The characteristics of fuel used in the vehicle include at least one of an octane rating, a volume of fuel, a brand of fuel, a fuel additive, a fuel type.

At 406, the vehicle performance data is analyzed with respect to the fuel to calculate a performance metric of the fuel. In an embodiment, analyzing the vehicle performance data and the fuel includes determining a driving profile of the vehicle during the time period. The driving profile may be a characterization of how the driver was driving during the time period, such as "aggressive," "conservative," or "mixed." The analyzing may also include identifying a fuel mixture used during the time period. When refueling, a tank is rarely completely empty. Thus, the analysis has to account for the mixed fuel. The analysis may do so by calculating a confidence factor based on the fuel mixture. The confidence factor indicates how confident the system is in rating the fuel's performance given the fact that there may be two or more fuels mixed together. As a result, the analysis then calculates a fuel performance rating for the driving profile, the fuel performance rating weighted by the confidence factor.

At 408, the performance metric is stored in a performance database.

The method 400 may further include receiving a request for a fuel recommendation from a user, the request including a vehicle identification. For example, a request may be made by a person who subscribes to a service. The request may be from a mobile device. In response to the request, the method 400 searches the performance database for a vehicle to match the vehicle identification, as provided by the requester. Based on the vehicle, the method 400 identifies a fuel having a fuel performance rating and provides the fuel and the fuel performance rating to the requesting user. In an embodiment, the fuel identified has the highest fuel performance rating for the vehicle.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
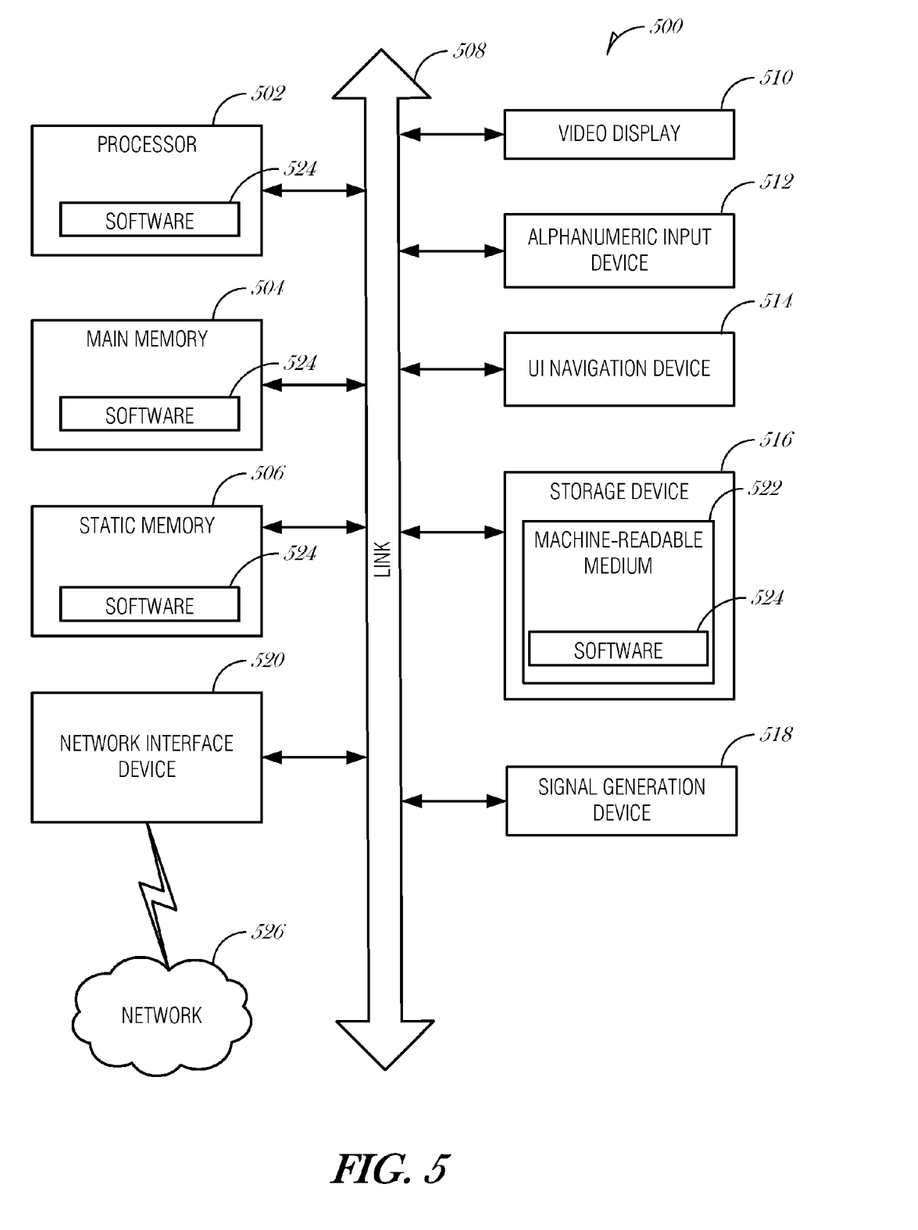
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an on-board vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter (such as a device, apparatus, or machine) comprising a system to create profiles of fuel quality, comprising a receiving module arranged to receive vehicle performance data of a vehicle, the vehicle performance data describing the vehicle's performance over a time period; an association module arranged to associate the vehicle performance data with fuel used by the vehicle during the time period; an analysis module arranged to analyze the vehicle performance data with respect to the fuel to calculate a performance metric of the fuel; and a storage module arranged to store the performance metric in a performance database at the computing system.

In Example 2, the subject matter of Example 1 may optionally include, wherein to receive vehicle performance data of the vehicle, the receiving module is arranged to: query an on-board vehicle system; and receive vehicle performance data from the on-board vehicle system.

In Example 3, the subject matter of any one or more of Examples 1 to 2 may optionally include, wherein the on-board vehicle system comprises an on-board diagnostics system.

In Example 4, the subject matter of any one or more of Examples 1 to 3 may optionally include, wherein to receive vehicle performance data of the vehicle, the receiving module is arranged to: access a terminal incorporated into a fuel pump station; and receive vehicle performance data from the terminal.

In Example 5, the subject matter of any one or more of Examples 1 to 4 may optionally include, wherein the terminal is configured to request and receive the vehicle performance data from an operator of the vehicle while at the fuel pump station.

In Example 6, the subject matter of any one or more of Examples 1 to 5 may optionally include, wherein the terminal is configured to request and receive the vehicle performance data from an on-board vehicle system incorporated into the vehicle while the vehicle is located at the fuel pump station.

In Example 7, the subject matter of any one or more of Examples 1 to 6 may optionally include, wherein to associate the vehicle performance data with fuel used by the vehicle, the association module is arranged to: identify the vehicle; and search a vehicle database to determine the fuel used at a previous fueling of the vehicle.

In Example 8, the subject matter of any one or more of Examples 1 to 7 may optionally include, wherein the vehicle database includes characteristics of the vehicle, characteristics of the vehicle's operation, and characteristics of fuel used in the vehicle.

In Example 9, the subject matter of any one or more of Examples 1 to 8 may optionally include, wherein the characteristics of the vehicle include at least one of a make, a model, or a year.

In Example 10, the subject matter of any one or more of Examples 1 to 9 may optionally include, wherein the characteristics of the vehicle's operation include at least one of a driving style, an average operating speed, or a distance since the last fueling.

In Example 11, the subject matter of any one or more of Examples 1 to 10 may optionally include, wherein the characteristics of fuel used in the vehicle include at least one of an octane rating, a volume of fuel, a brand of fuel, a fuel additive, a fuel type.

In Example 12, the subject matter of any one or more of Examples 1 to 11 may optionally include, wherein to analyze the vehicle performance data and the fuel, the analysis module is arranged to: determine a driving profile of the vehicle during the time period; identify a fuel mixture used during the time period; calculate a confidence factor based on the fuel mixture; and calculate a fuel performance rating for the driving profile, the fuel performance rating weighted by the confidence factor.

In Example 13, the subject matter of any one or more of Examples 1 to 12 may optionally include, a user module arranged to: receive a request for a fuel recommendation from a user, the request including a vehicle identification; search the performance database for a vehicle to match the vehicle identification; based on the vehicle, identifying a fuel having a fuel performance rating; and provide the fuel and the fuel performance rating to the user.

In Example 14, the subject matter of any one or more of Examples 1 to 13 may optionally include, wherein the fuel identified has the highest fuel performance rating for the vehicle.

Example 15 includes subject matter for creating profiles of fuel quality (such as a method, means for performing acts, machine readable medium including instructions that when performed by a machine cause the machine to performs acts, or an apparatus configured to perform) comprising receiving, at a computing system, vehicle performance data of a vehicle, the vehicle performance data describing the vehicle's performance over a time period; associating the vehicle performance data with fuel used by the vehicle during the time period; analyzing the vehicle performance data and the fuel to calculate a performance metric; and storing the performance metric in a performance database at the computing system.

In Example 16, the subject matter of Example 15 may optionally include, wherein receiving vehicle performance data of the vehicle comprises: querying an on-board vehicle system; and receiving vehicle performance data from the on-board vehicle system.

In Example 17, the subject matter of any one or more of Examples 15 to 16 may optionally include, wherein the on-board vehicle system comprises an on-board diagnostics system.

In Example 18, the subject matter of any one or more of Examples 15 to 17 may optionally include, wherein receiving vehicle performance data of the vehicle comprises: accessing a terminal incorporated into a fuel pump station; and receiving vehicle performance data from the terminal.

In Example 19, the subject matter of any one or more of Examples 15 to 18 may optionally include, requesting and receiving, by the terminal, the vehicle performance data from an operator of the vehicle while at the fuel pump station.

In Example 20, the subject matter of any one or more of Examples 15 to 19 may optionally include, requesting and receiving, by the terminal, the vehicle performance data from an on-board vehicle system incorporated into the vehicle while the vehicle is located at the fuel pump station.

In Example 21, the subject matter of any one or more of Examples 15 to 20 may optionally include, wherein associating the vehicle performance data with fuel used by the vehicle comprises: identifying the vehicle; and searching a vehicle database to determine the fuel used at a previous fueling of the vehicle.

In Example 22, the subject matter of any one or more of Examples 15 to 21 may optionally include, wherein the vehicle database includes characteristics of the vehicle, characteristics of the vehicle's operation, and characteristics of fuel used in the vehicle.

In Example 23, the subject matter of any one or more of Examples 15 to 22 may optionally include, wherein the characteristics of the vehicle include at least one of a make, a model, or a year.

In Example 24, the subject matter of any one or more of Examples 15 to 23 may optionally include, wherein the characteristics of the vehicle's operation include at least one of a driving style, an average operating speed, or a distance since the last fueling.

In Example 25, the subject matter of any one or more of Examples 15 to 24 may optionally include, wherein the characteristics of fuel used in the vehicle include at least one of an octane rating, a volume of fuel, a brand of fuel, a fuel additive, a fuel type.

In Example 26, the subject matter of any one or more of Examples 15 to 25 may optionally include, wherein analyzing the vehicle performance data and the fuel comprises: determining a driving profile of the vehicle during the time period; identifying a fuel mixture used during the time period; calculating a confidence factor based on the fuel mixture; and calculating a fuel performance rating for the driving profile, the fuel performance rating weighted by the confidence factor.

In Example 26, the subject matter of any one or more of Examples 15 to 25 may optionally include, receiving a request for a fuel recommendation from a user, the request including a vehicle identification; searching the performance database for a vehicle to match the vehicle identification; based on the vehicle, identifying a fuel having a fuel performance rating; and providing the fuel and the fuel performance rating to the user.

In Example 28, the subject matter of any one or more of Examples 15 to 27 may optionally include, wherein the fuel identified has the highest fuel performance rating for the vehicle.

Example 29 includes subject matter for creating profiles of fuel quality comprising means for performing any one of the examples of 1-28.

Example 30 includes an apparatus for creating profiles of fuel quality, the apparatus comprising: means for receiving, at a computing system, vehicle performance data of a vehicle, the vehicle performance data describing the vehicle's performance over a time period; means for associating the vehicle performance data with fuel used by the vehicle during the time period; means for analyzing the vehicle performance data and the fuel to calculate a performance metric; and means for storing the performance metric in a performance database at the computing system.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A non-transitory machine-readable medium including instructions for creating profiles of fuel quality, which when executed by a machine, cause the machine to:
   receive vehicle performance data of a vehicle, the vehicle performance data describing the vehicle's performance over a time period;
   associate the vehicle performance data with fuel used by the vehicle during the time period;
   analyze the vehicle performance data and the fuel to calculate a performance metric by:
      determining a driving profile of the vehicle during the time period;
      identifying a fuel mixture used during the time period, the fuel mixture comprising fuel from at least two refuelings of the vehicle associated with the time period;
      calculating a confidence factor based on the fuel mixture, the confidence factor indicating a confidence of the vehicle performance data in view of the fuel mixture of the at least two refuelings; and
      calculating a fuel performance rating for the driving profile, the fuel performance rating weighted by the confidence factor; and
   store the performance metric in a performance database.

2. The machine-readable medium of claim 1, wherein the instructions to receive vehicle performance data of the vehicle comprise instructions to:
   query an on-board vehicle system; and
   receive vehicle performance data from the on-hoard vehicle system.

3. The machine-readable medium of claim 2, wherein the on-board vehicle system comprises an on-board diagnostics system.

4. The machine-readable medium of claim 1, wherein the instructions to receive vehicle performance data of the vehicle comprise instructions to:
   access a terminal incorporated into a fuel pump station; and
   receive vehicle performance data from the terminal.

5. The machine-readable medium of claim 4, comprising instructions to:
   request and receive, by the terminal, the vehicle performance data from an operator of the vehicle while at the fuel pump station.

6. The machine-readable medium of claim 4, comprising instructions to:
   request and receive, by the terminal, the vehicle performance data from an on-board vehicle system incorporated into the vehicle while the vehicle is located at the fuel pump station.

7. The machine-readable medium of claim 1, wherein instructions to associate the vehicle performance data with fuel used by the vehicle comprise instructions to:
   identify the vehicle; and
   search a vehicle database to determine the fuel used at a previous fueling of the vehicle.

8. The machine-readable medium of claim 7, wherein the vehicle database includes characteristics of the vehicle, characteristics of the vehicle's operation, and characteristics of fuel used in the vehicle.

9. The machine-readable medium of claim 8, wherein characteristics of the vehicle include at least one of a make, a model, or a year.

10. The machine-readable medium of claim 8, wherein the characteristics of the vehicle's operation include at least one of a driving style, an average operating speed, or a distance since the last fueling.

11. The machine-readable medium of claim 8, wherein the characteristics of fuel used in the vehicle include at least one of an octane rating, a volume of fuel, a brand of fuel, a fuel additive, a fuel type.

12. The machine-readable medium of claim 1, further comprising instructions to:
   receive a request for a fuel recommendation from a user, the request including a vehicle identification;
   search the performance database for a vehicle to match the vehicle identification;
   based on the vehicle, identify a fuel having a fuel performance rating; and
   provide the fuel and the fuel performance rating to the user.

13. The machine-readable medium of claim 12, wherein he fuel identified has the highest fuel performance rating for the vehicle.

14. A system to create profiles of fuel quality, the system comprising:
   a receiving circuit arranged to receive vehicle performance data of a vehicle, the vehicle performance data describing the vehicle's performance over a time period;
   an association circuit arranged to associate the vehicle performance data with fuel used by the vehicle during the time period;
   an analysis circuit arranged to analyze the vehicle performance data with respect to the fuel to calculate a performance metric of the fuel, wherein to analyze the vehicle performance data, the analysis circuit is configured to:
      determine a driving profile of the vehicle during the time period;
      identify a fuel mixture used during the time period, the fuel mixture comprising fuel from at least two refuelings of the vehicle associated with the time period;
      calculate a confidence factor based on the fuel mixture, the confidence factor indicating a confidence of the vehicle performance data in view of the fuel mixture of the at least two refuelings; and
      calculate a fuel performance rating for the driving profile, the fuel performance rating weighted by the confidence factor; and
   a storage circuit arranged to store the performance metric in a performance database at the computing system.

15. The system of claim 14, wherein to receive vehicle performance data of the vehicle, the receiving circuit is arranged to:
   query an on-board vehicle system; and
   receive vehicle performance data from the on-board vehicle system.

16. The system of claim 15, wherein the on-board vehicle system comprises an on-board diagnostics system.

17. The system of claim 14, wherein to receive vehicle performance data of the vehicle, the receiving circuit is arranged to:
   access a terminal incorporated into a fuel pump station; and
   receive vehicle performance data from the terminal.

18. The system of claim 17, wherein the terminal is configured to request and receive the vehicle performance data from an operator of the vehicle while at the fuel pump station.

19. A method for creating profiles of fuel quality, the method comprising:
   receiving, at a computing system, vehicle performance data of a vehicle, the vehicle performance data describing the vehicle's performance over a time period;
   associating the vehicle performance data with fuel used by the vehicle during the time period;
   analyzing the vehicle performance data and the fuel to calculate a performance metric, wherein analyzing the vehicle performance data and the fuel comprises:
      determining a driving profile of the vehicle during the time period;
      identifying a fuel mixture used during the time period;
      calculating a confidence factor based on the fuel mixture; and,
      calculating a fuel performance rating for the driving profile, the fuel performance rating weighted by the confidence factor: and
   storing the performance metric in a performance database at the computing system.

20. The method of claim 19, further comprising:
   receiving a request for a fuel recommendation from a user, the request including a vehicle identification;
   searching the performance database for a vehicle match the vehicle identification;

based on the vehicle, identifying a fuel having a fuel performance rating; and providing the fuel and the fuel performance rating to the user.

\* \* \* \* \*

UNITED STATES PATENT AND TRADEMARK OFFICE
CERTIFICATE OF CORRECTION

PATENT NO. : 9,953,473 B2  
APPLICATION NO. : 15/023208  
DATED : April 24, 2018  
INVENTOR(S) : Plowman et al.

Page 1 of 1

It is certified that error appears in the above-identified patent and that said Letters Patent is hereby corrected as shown below:

On the Title Page

Column 2, Line 11, item [57], delete "arrranged" and insert --arranged-- therefor In the Claims Column 13, Line 5, Claim 2, delete "on-hoard" and insert --on-board-- therefor

Column 13, Line 60, Claim 13, delete "he" and insert --the-- therefor

Column 14, Line 57, Claim 19, after "and", delete ","

Column 14, Line 60, Claim 19, delete "factor:" and insert --factor;-- therefor

Column 14, Line 66, Claim 20, after "vehicle", insert --to--

Signed and Sealed this  
Fourth Day of June, 2019

Andrei Iancu  
*Director of the United States Patent and Trademark Office*